United States Patent [19]

Probstein et al.

[11] 4,151,084
[45] Apr. 24, 1979

[54] LAMELLA SEPARATORS

[75] Inventors: Ronald F. Probstein, Brookline, Mass.; David Yung, Woodridge, Ill.

[73] Assignee: Water Purification Associates, Cambridge, Mass.

[21] Appl. No.: 839,782

[22] Filed: Oct. 6, 1977

[51] Int. Cl.² .......................................... B01D 21/24
[52] U.S. Cl. .................................... 210/97; 210/322; 210/519; 210/522
[58] Field of Search ............... 210/86, 96 R, 322, 519, 210/521, 522

[56] References Cited

U.S. PATENT DOCUMENTS

| | | | |
|---|---|---|---|
| 1,825,550 | 9/1931 | Schulte | 210/521 |
| 2,883,059 | 4/1959 | Dunnington et al. | 210/519 |
| 3,706,384 | 12/1972 | Hane | 2 10/522 X |
| 3,812,966 | 5/1974 | Beach et al. | 210/96 X |
| 3,903,000 | 9/1975 | Miura et al. | 210/522 X |

Primary Examiner—John Adee
Attorney, Agent, or Firm—Robert F. O'Connell

[57] ABSTRACT

An improved lamella separator which reduces the contamination of the clear liquid output thereof in comparison with conventional lamella separators of the prior art. In a preferred embodiment thereof, the thickness of the feed liquid layer containing solid material is monitored at one or more regions in each of the channels of the separator so that when the thickness thereof approaches or exceeds about one half the channel depth in one or more channels, a control system responsive thereto maintains such thickness in such one or more channels at less than one half the channel depth.

11 Claims, 5 Drawing Figures

LAMELLA SEPARATORS

INTRODUCTION

This invention relates generally to apparatus for separating solid material from fluids and, more particularly, to improved apparatus of the type known as lamella sedimentation separators, or settlers.

BACKGROUND OF THE INVENTION

Lamella separators, or settlers, provide for relatively high flow rate separation of liquids and solids by utilizing a plurality of inclined plates forming a plurality of inclined channels into which a liquid feed containing suspended solid material, for example, is introduced at a selected region of each of the channels. Clear liquid is thereupon removed from one end of the channels, while the solid material which collects on the lower surface of each of the channels ultimately settles at the opposite end of each of the channels and, thence, at a common settling tank from which it can thereupon be removed. The build-up of solids can be appropriately monitored, if desired, at the settling tank and when the build-up reaches an appropriate level, the solid material is removed by suitable pumping means. The solids, or solid material, as referred to here, at the settling tank and along the lower surfaces of each channel is in the form of a concentrated slurry. In addition to rapid sedimentation, such structures are relatively compact and substantially reduce the spatial requirements in comparison with a conventional settling basin or clarifier so that a high capacity output per unit volume is achievable.

Typical structures and the operation thereof utilizing inclined channels of this general type are discussed, for example, in U.S. Pat. Nos. 1,190,863; 1,746,156; 1,825,550; 3,494,475; 3,552,554; and 2,573,615. Other descriptions of separators of the lamella type can be found in the articles: "Lamella Sedimentation: A Compact Separation Technique," by B. Forsell and B. Hedstrom, Journal WPCF, Vol. 47, No. 4, Apr. 1975, pages 834–842; "The Lamella Separator; A Novel High Rate Sedimentation Device for Water Treatment Plants" (G. P. Souther and B. Forsell, Proceedings of the 32nd International Water Conference, Engineers Society of Western Pennsylvania, Pittsburgh, pages 180–182 (1971)); and "The SALA Lamella Thickener," SALA Information, published by SALA INTERNATIONAL, Sala, Sweden.

While such structures can operate effectively, particularly in comparison with a conventional settling basin or clarifier, a problem which has arisen with presently available lamella separator designs is that the clear liquid output thereof is often found to be contaminated with the solid material that is present in the feed liquid. Such contamination results from a mixing of the stream of clarified liquid with the feed stream containing the solid material and the entrainment of the contaminated clarified liquid by the clear liquid output. Contamination is normally further aggravated by the manner in which such present day devices are fed and controlled, the operation thereof leading to a reverse flow of the solid-containing feed liquid in the parallel channels, such reversal enhancing the contamination of the overflow or clear liquid output. Up to now no really effective method for substantially reducing such undesired contamination of the clear liquid output under such conditions has been successfully devised.

BRIEF SUMMARY OF THE INVENTION

In accordance with the invention, it has been found that if the thickness of the layer of feed liquid at one or more selected regions of the channel is controlled so as to be maintained at a thickness less than one-half the channel depth, such contamination can be substantially entirely eliminated. In accordance with one preferred embodiment of the invention, each channel is provided with a control means which monitors the thickness of the feed liquid layer at one or more selected regions. If the thickness thereat approaches or exceeds half the channel depth, clear liquid is supplied at a pressure greater than the normal channel operating pressure to each channel in such a manner that the expanding layer of feed liquid is reduced in thickness to less than half the channel depth whereby contamination of the clear liquid output flow is prevented.

Once the thickness of the feed liquid layer is reduced in such a manner at the region or regions selected for monitoring, the system stabilizes and clear liquid need no longer be so supplied thereto. Should the flow characteristics again change such as to increase the thickness at the feed liquid layer at such region, or regions, the control system once again operates to stabilize the system in the same manner.

The invention can be described in more detail with the help of the accompanying drawings wherein FIG. 1 shows a diagrammatic side view of a lamella separator of the prior art;

Figure 1:
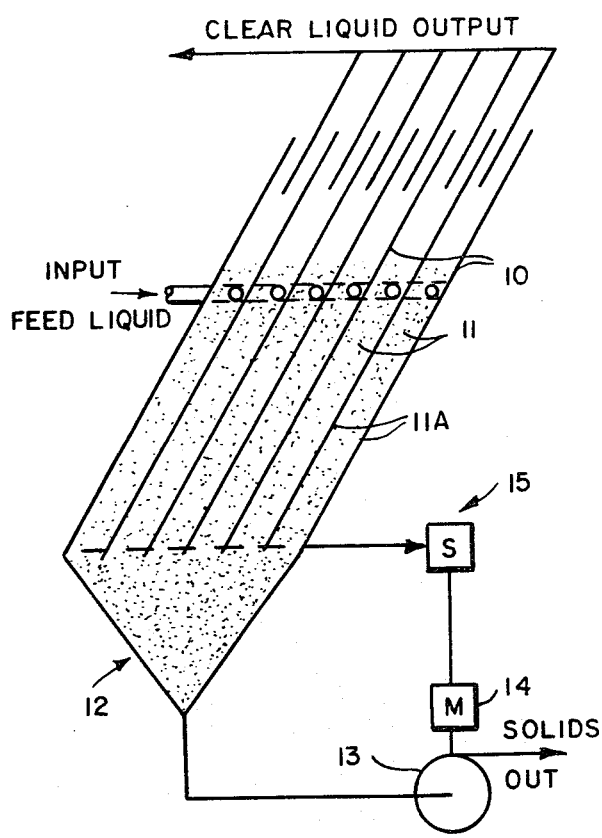

FIG. 1 shows a diagrammatic side view of a lamella separator, or settler, of the prior art. Since such structure and operation is well known to those in the art, a detailed drawing thereof is not necessary. In review thereof a plurality of inclined plates 10 form a plurality of inclined channels 11 into which an appropriate feed liquid having solid material therein is supplied, as shown. The solid material tends to settle along the lower, or bottom, surfaces 11A of each channel, such solid materials thereupon gradually moving downwardly where they are collected in an appropriate common settling tank 12 from which they can be removed by a suitable pump 13. The pump motor 14 is controlled by a detection or sensing element 15 which detects the concentration of solid material in a manner well known in the art and provides a suitable motor excitation signal such that when the concentration reaches a preselected level the solid material can be suitably pumped from settling tank 12.

Relatively clear liquid (i.e., having a lower concentration of solid material than the input feed liquid) thereupon flows upwardly in each of the channels 11 to the upper ends thereof where it is suitably removed by techniques (not shown) well known to those in the art.

Figure 2:
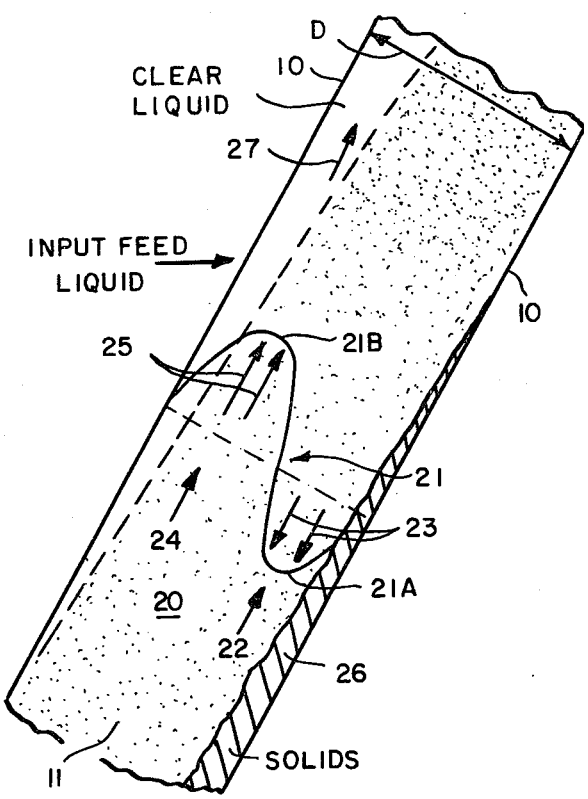
FIG. 2 shows a portion of the separator of FIG. 1 depicting the flow characteristics thereof.

A major problem with prior art devices of this type lies in the fact that the desired clear liquid is often contaminated with solid material from the input feed liquid so that the purity of the output liquid feed is adversely affected. Such contamination often results from a phenomenon which can be described with reference to FIG. 2, which shows an exemplary channel 11 of the type discussed with reference to FIG. 1. It is found that if the layer of feed liquid 20 containing the suspended solid material is greater than one-half the channel depth D, a reverse flow of feed liquid can occur substantially all along the channel as shown by the exemplary curve 21. Thus, in region 22 of channel 11 the feed liquid flows in the desired generally downward direction as depicted by arrows 23 associated with the portion 21A of curve 21. In the region 24 of channel 11 the feed liquid reverses its flow and flows generally upwardly as shown by arrows 25 associated with portion 21B of curve 21. As can be seen, under such conditions the thickness of the feed liquid is greater than one-half the channel depth. The layer of slurry containing the solid material is shown therein as layer 26, while the clear liquid is shown as flowing in the direction of arrow 27 to the output overflow end of the channel.

Because of such reversal of the flow, the portion of the clarified layer that is contaminated with solid material due to mixing of the clarified and feed layers is carried upward and leaves with the clear liquid output.

Figure 3:
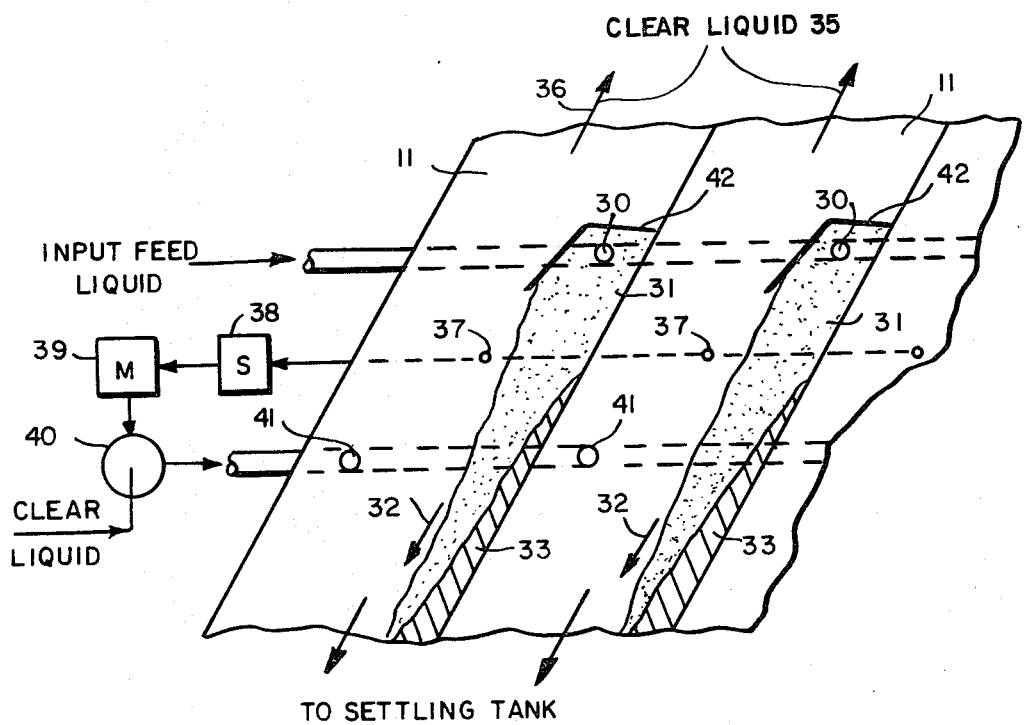
FIG. 3 shows an improved lamella separator of the type shown in FIG. 1 in accordance with one embodiment of the invention.

In order to avoid such problem the structure, as shown diagrammatically in FIG. 3, is utilized in accordance with the invention. As can be seen therein, with respect to the exemplary channels 11, the feed liquid is appropriately supplied as through an opening 30 so as to form a layer 31 thereof which extends throughout the channel, thereupon flowing in a generally downward direction toward the settling tank as shown by arrow 32. A layer 33 of slurry containing the solid material is formed along the lower surface 11A of each channel, layer 33 gradually expanding along the direction of arrow 32. In the operation of conventional separators the thickness of the layer 31 of feed liquid either enters at greater than one-half the channel depth D, or tends to rapidly expand until it becomes greater than one-half the depth D of channels 11 so that a reversal of flow occurs as discussed with reference to FIG. 2. Accordingly, the clear liquid 35 flowing upwardly in the direction of arrow 36 has intermingled therewith the free liquid, as discussed above.

In order to avoid such problem, in accordance with the invention a detector 37 for detecting the concentration of solid material is placed at a position approximately midway between the plates which form each of the channels at a location which is removed from the feed opening 30 in the direction of arrow 32. The concentration level is thereby sensed at such region so that, if the concentration level shows that feed liquid containing solid material is present at the location of detector 37, an indication is thereby provided to show that the thickness of the feed liquid layer has increased to a point which essentially equals or has exceeded one-half the depth of the channel. The detector thereby provides a signal which can be suitably amplified at element 38 to provide an excitation signal for motor 39 which actuates a pump 40. Pump 40 is utilized to inject clear liquid through an opening 41 at an appropriate location also removed from opening 30 in the direction of arrow 32. This clear liquid is normally the same as the clear liquid output and would usually be derived from the clear liquid output stream. However, any suitable clear liquid, appropriate to the particular system, may be used. The clear liquid is injected at a pressure greater than the normal operating pressure within the channel and causes the layer of feed liquid to be compressed so that the thickness thereof is reduced all along its length to a thickness less than half the channel width, as shown in FIG. 3. By reducing such thickness the reverse flow condition thereof is prevented and so long as such operation is stabilized so that the thickness remains at less than one-half the channel depth the contaminated portion of the clarified layer is drawn downwards and is prevented from leaving with the clear liquid output. The solid content of the clear liquid is thereby substantially reduced. Once such stable condition has been established, the injection of clear liquid can be stopped and the system should remain substantially stable from that point on. Accordingly, such clear liquid injection control would normally be required only during the start-up of the overall system at which point the conditions may be such as to provide an expansion of the feed fluid layer beyond the mid-point of the channel depth D.

Should conditions change during operation of the system at a later point in time, the detector 37 will detect any undesired increase in the thickness of feed layer 35 so that the control system will again be put into operation for injecting clear liquid for reducing such thickness to a level below one-half the channel depth.

While the embodiment of FIG. 3 shows a system in which the clear liquid is supplied simultaneously to all channels when a detector in any one channel indicates that the feed liquid layer has exceeded one-half the channel depth, the system can also be set up to operate in others ways. For example, the system may be controlled through appropriate valve means in ways well known to those in the art to provide for control of each channel separately so that, if the feed liquid layer exceeds one-half the channel depth in only one, or less than all, channels clear liquid is supplied only to those channels in which such condition has been detected.

In some applications the system operation may be further enhanced if a baffle 42 is placed within the channel in conjunction with the feed liquid, as shown in FIG. 3, and used in addition to the clear liquid injection control system. The use of a baffle tends to assist the control system in rapidly reducing an expanded layer to a thickness less than half the channel thickness, although the presence thereof is not absolutely necessary in most applications.

Figure 4:
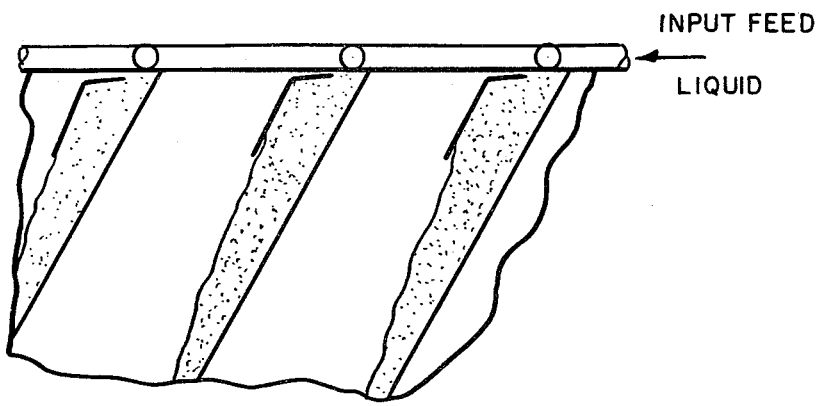
FIG. 4 shows an alternative embodiment of the separator of FIG. 3 using the invention.

The system may be useful not only when the feed liquid is injected at a point below the top of each channel, as shown in the embodiment of FIG. 3, but also when the feed liquid is inserted at the top of each channel, as shown in FIG. 4. In such case it may be desirable to provide a suitable baffle for assuring that the thickness of the feed liquid as supplied to each channel enters at less than one-half the depth of the channel.

Figure 5:
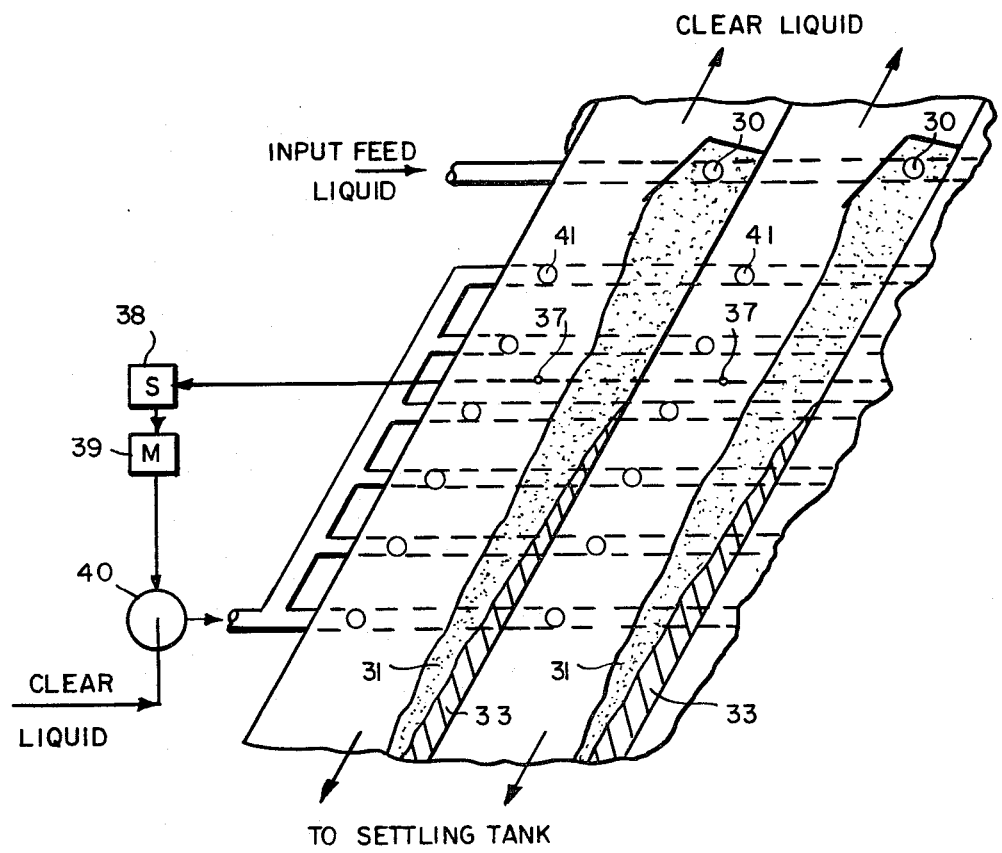
FIG. 5 shows another alternative embodiment of the invention.

Although the system as shown in FIGS. 3 and 4 provides for the introduction of clear liquid at a single region of each channel in accordance with the control system depicted therein, in some applications it may be desirable to inject such clear liquid at more than one region along the channel so that the thickness of feed liquid layer 31 can be rapidly reduced along the length thereof. As shown in FIG. 5, for example, a single detector 37 provides a control signal for controlling the introduction of clear liquid at a number of points 41 along each channel. Stability can be rapidly achieved by such a system. If desired, more than one detector can be utilized in providing such control.

In some applications it may be helpful, in achieving stability of operation more rapidly, to temporarily close off the input feed liquid during the time at which the control system is in operation by means of an automatically operated valve system, for example. In many applications, however, such feed liquid shutoff is not required and the system can continue to feed the liquid while the control system is in operation.

Other modifications to the invention may occur to those in the art within the spirit and scope thereof and the invention is not deemed to be limited to the particular embodiments described herein except as set forth in the appended claims.

What is claimed is:

1. Apparatus for separating solid material from feed fluid containing said solid material, said apparatus comprising a plurality of parallel, inclined channels each channel having a lower surface;

means for feeding said feed fluid into each of said channels at a preselected region thereof, said solid material generally settling along an inclined surface of each of said channels and said feed fluid forming a layer thereof generally extending from said preselected region along a first direction and flowing in said first direction in each said channel, fluid which is clear of said solid material generally flowing through each said channel in a second direction opposite to said first direction, a portion of said feed fluid tending to flow in said second direction when the thickness of said input feed fluid layer approaches or exceeds about one-half the depth of said channel;

control means effective during operation of said apparatus for maintaining the thickness of said feed fluid layer in the region adjacent the lower surface of each channel at less than one-half the depth of said channel at said preselected region and substantially along the length of said channel to prevent any substantial flow of said feed fluid in said second direction and thereby to prevent the solid material which is contaminating the clarified layer from being entrained by said clear fluid output;

means for removing said clear fluid at one end of each of said channels; and means for removing said solid material at the other end of each of said channels.

2. Apparatus in accordance with claim 1 wherein said control means includes means positioned in each of said channels at at least one selected region for detecting the presence of said feed fluid layer when the thickness thereof approaches or exceeds about one-half the depth of said channel at said selected region; and means responsive to said detecting means for supplying a clear fluid from any suitable source under pressure to one or more of said channels at one or more selected locations therein such that said clear fluid flows in said second direction and compresses said layer of feed fluid so as to reduce said layer to a thickness less than one-half the depth of said channels.

3. Apparatus in accordance with claim 2 wherein said feed fluid is a liquid.

4. Apparatus in accordance with claim 3 wherein said detecting means includes means for detecting when the concentration of solid material in said feed liquid layer at said at least one selected region exceeds a predetermined level; and means responsive to said detecting means for providing an actuation signal when said concentration exceeds said predetermined level.

5. Apparatus in accordance with claim 4 wherein said control means further includes pump means for pumping clear fluid into each of said channels at said one or more selected locations; and means responsive to said actuation signal for actuating said pump means.

6. Apparatus in accordance with claim 1 wherein said control means comprises means mounted at said preselected region in each of said channels for maintaining the feed fluid layer at said preselected region at a thickness less than one-half the depth of said channel.

7. Apparatus in accordance with claim 2 wherein said clear fluid supplying means supplies said clear fluid at one or more selected locations in each said channel.

8. Apparatus in accordance with claim 1 wherein said feed fluid is fed to each of said channels at a preselected region which is generally remote from either end of said channels.

9. Apparatus in accordance with claim 1 wherein said feed fluid is fed to each of said channels at one end thereof.

10. Apparatus in accordance with claim 1 wherein said clear fluid supplying means supplies said clear fluid to all of said channels.

11. Apparatus in accordance with claim 2 wherein said clear fluid supplying means supplies said clear fluid only to those channels in which said detecting means has detected that the thickness of said feed fluid layer has approached or exceeded about one-half the channel depth.

* * * * *